Patented Dec. 22, 1953

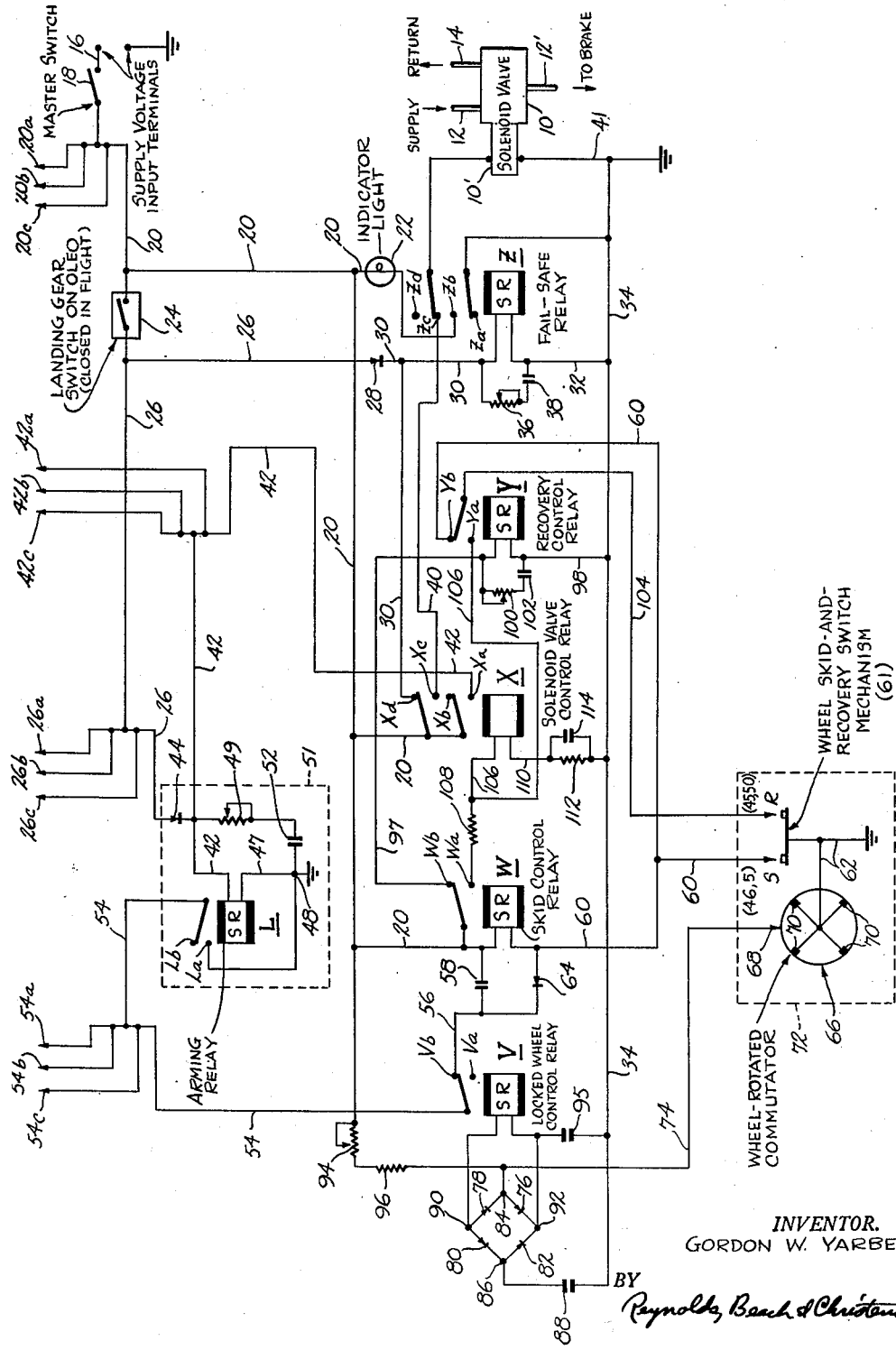

2,663,521

UNITED STATES PATENT OFFICE 2,663,521

AIRPLANE LANDING WHEEL BRAKE CONTROL APPARATUS

Gordon W. Yarber, near Seattle, Wash., assignor to Boeing Airplane Company, Seattle, Wash., a corporation of Delaware Application April 20, 1951, Serial No. 222,049

13 Claims. (Cl. 244—111)

This invention relates to automatic brake control systems and more particularly to automatic skid-preventing apparatus for airplane landing wheel brake systems. The present invention is directed to certain improvements over the generally similar automatic systems disclosed in my copending application Serial No. 90,965, filed May 2, 1949, now U. S. Patent No. 2,631,709 of March 17, 1952, and in the copending application Serial No. 145,368, now U. S. Patent No. 2,636,700 of April 28, 1953, filed February 21, 1950, of Gordon W. Yarber, Harry H. Howell and Rush F. Chase. The presently improved system is herein illustratively described by reference to its application in the case of large bomber, transport or similar airplanes. The various constants of the circuit apparatus, including the different time delay factors and the sizes or magnitudes of the different circuit parameters are given as representative in a typical system developed for that purpose.

A general object of this invention is to provide an improved and more versatile anti-skid brake control system of the type described, capable of operating under a wider range of airplane landing conditions and of coping automatically with a greater number of different events or contingencies than previous systems. As a result the improved system herein described provides more reliable and efficient brake operation, and overcomes to an even greater extent the possible effects of human error and misjudgment of the pilot in controlling the brakes than heretofore.

More specifically, an object of the present invention is to provide an improved locked-wheel prevention control, which will insure that the landing wheel brakes cannot be applied until the landing wheel has accelerated substantially to full rotative speed upon initial ground contact. The purpose of such control, therefore, is to prevent landing with a skidding wheel, as such a skid might go undetected, and moreover, even if it were detected by the mechanism, might initiate a degenerative braking condition of the system, from which it might not readily recover.

A related object of the invention is a locked-wheel prevention control which will automatically become inoperative when the airplane is brought to a standstill, so that the locked-wheel prevention control will not be permitted to release the airplane's brakes at a time when it is desired to maintain them in the applied condition.

Still another object is a locked wheel prevention control which will operate effectively during bounce landings as well as during the initial approach of the airplane to the ground. As a result such control will prevent untimely application of the brakes in the interval between successive ground contacts of the wheel in the case of a faulty or bounce landing, as desired.

Another object of the invention is to provide a locked wheel prevention control operable to prevent locked wheel condition during landing on an extremely slippery runway, such as a runway covered with wet ice, for example. If, for instance, braking efficiency of the system should degenerate progressively to the low point represented by the locked wheel condition, said locked-wheel prevention control will automatically release the brakes long enough to permit acceleration of the wheel and thereby initiate a process of regeneration of braking efficiency.

In its preferred and herein illustrated form, the invention is applied as an automatic control system which at certain times and under certain conditions selectively interrupts and restores braking otherwise under control of the airplane pilot. In other words, such automatic system does not of itself in the first instance apply the brakes nor regulate instantaneous brake pressure; instead it effectuates automatic release of the brakes under predetermined conditions and for controlled intervals of time and thereby imposes certain limitations on the ability of controls operated by the pilot to apply the brakes. In the example such results are accomplished by selective energization and deenergization of a solenoid valve interposed in the hydraulic pressure conduit to a wheel's brakes. However, the invention is not necessarily limited in these respects as will become evident from an understanding of the general nature thereof set forth herein.

In general, therefore, the invention comprises brake-release means operable in one sense or direction to effect release of the brakes and in another sense to effect application or reapplication thereof, combined with various automatic means in the system controlling operation of such brake-release means. The principal or central portion of the automatic means in the system comprises skid-preventing means which, as in the above-cited two patent applications, automatically regulates application of the brakes to obtain maximum effective braking effort with minimum skidding of the wheel. Preferably the automatic skid-preventing means is of the type generally disclosed in the above-cited application Serial No. 90,965, although systems embodying features of the present invention are not necessarily limited thereto.

An important feature of the present invention resides in the provision of locked-wheel preventing means controlled by wheel rotation and operatively connected to the brake-release means for actuating the same and thereby effecting release of the brake automatically in response to stopping of wheel rotation. Such locked-wheel preventing means is arranged to operate independently of the automatic skid-preventing apparatus.

More specific features of the invention reside in the particular apparatus comprising such locked-wheel preventing means. As herein described, the locked wheel condition is prevented by a locked-wheel control relay and an energizing circuit therefor which includes a wheel-rotated commutator or switch and suitable circuit means such as a full-wave bridge rectifier operable to convert commutator signals into control relay energizing current during rotation of the wheel. When the braked wheel stops rotating, the resulting release of the locked-wheel control relay causes actuation or energization of the brake-release means to free such wheel so that it may again rotate. When the wheel again rotates, the locked-wheel control relay is reenergized, a development which might be expected to restore braking and thereby the original locked wheel condition. However, time delay means included in the locked-wheel control relay is again energized by such renewal of wheel rotation. Thus under exceedingly slippery runway conditions, should wheel braking degenerate to the locked wheel condition by operation of the skid-preventing portion of the system, the brakes will be automatically released for a definite short period of time which is usually long enough for initiation of a regenerative action restoring the wheel to running speed and the braking operations to normal, as more fully explained hereinafter.

Another feature of the improved system resides in the provision therein of arming means operable to disable the locked-wheel preventing means with the airplane at a standstill, so that the brakes may then be locked without interference, as desired. However, in order to insure that said arming or disabling means will remain inoperative under other conditions, such as during the landing run in general, and thereby will not interfere with normal operations of the locked-wheel preventing means, such arming means is itself deactivated by and during normal operation of the skid-preventing means. Because the normal operation of the skid-preventing means is intermittent by nature, a time delay element is provided with such arming means to extend the period of effectiveness thereof sufficiently to bridge the intervals between successive operation of the skid-preventing means, so that such arming means will not become ineffectual during normal intervals between operations of such skid-preventing means.

Still another feature of the improved system resides in the provision of an independent control for the locked-wheel preventing means which enables it to be used as a means for the additional purpose of insuring that the brakes will be in released condition during approach of the airplane to the ground, so that the brakes may not be applied before landing or prematurely upon landing. Such independent control preferably comprises a weight actuated device such as an electrical switch on the oleo mechanism of the landing gear which, while the airplane is in the air and the oleo is extended, renders the disabling means inoperative and thereby insures that the locked-wheel preventing means may function for its additional purpose just mentioned. The same control element cooperates with the locked-wheel preventing means to produce a similar result in the event of a bounce landing so that the brakes will not be locked upon the second ground contact of the landing wheel at the end of a bounce. These and other features, objects and advantages of the present invention will become more fully evident from the following description of the preferred application thereof illustrated in the accompanying drawing. The drawing is a schematic diagram of an automatic control system illustrating the present invention as well as certain features or components more fully illustrated and described in the above cited copending patent applications.

*General description*

The system illustrated in the circuit diagram is that which is used for controlling the brakes of one landing wheel of the airplane, the solenoid valve 10 being connected in the hydraulic conduits to control the brake. Apart from certain elements common to all, a similar system and associated solenoid valve controlled thereby will be used for each additional wheel of the airplane to be provided with automatically controlled braking.

Any conventional solenoid valve of suitable form may be used which will block flow of pressure fluid from conduit 12 to the wheel brake (not shown) through conduit 12' when the control solenoid 10' is energized, and which will automatically restore communication between such conduits when such solenoid is deenergized. During the energized condition of solenoid 10' the valve interconnects conduits 12' and 14, the latter returning to the prime source of pressure fluid to permit relief of pressure in the brake actuators (not shown). The function of the system appearing in the figure is to energize and deenergize solenoid 10' in the manner and during the times and conditions to be described more fully hereinafter, to control removal and reapplication of the brakes accordingly.

In an airplane, the voltage applied to conductor 16 (upper right hand corner of diagram) will ordinarily be in the range from 18 to 30 volts D. C. A master control switch 18 is closed when the system is to be energized. Closure of such switch applies voltage to the bus conductor 20 having several branches in the circuit. Similar conductors 20a, 20b and 20c are provided to carry energizing current to three other similar systems in the airplane having four independently controlled braked wheels. An indicator light 22 interposed in one of the branches of conductor 20 in series with contact Zb of relay Z illuminates when this relay assumes released condition. This relay is termed a fail-safe relay and is of the slow release type. As later explained, release of relay Z occurs only when the system has failed to operate within a normal or prescribed period corresponding to the slow release period of the relay, because of malfunctioning of some part or section of the system. Under such conditions release of the relay Z deenergizes solenoid 10' and permits reapplication of the brakes despite the operating conditions in any other part of the system. The indicator light 22 then informs the pilot that the system has failed whereby he will know that the brakes must be operated solely by manual control, or without benefit of the automatic system.

A landing gear switch 24 is mounted on the landing wheel oleo mechanism in such manner that when the wheel is off the ground and the oleo is extended, switch 24 will be closed. Thus switch 24 is a normally closed switch arranged to be opened automatically by contact of the landing wheel with the ground to displace the oleo mechanism. In flight this switch applies voltage to the distribution conductor 26 having several branches as shown. Similar conductors 26a, 26b and 26c carry voltage to the other similar brake control systems, to which landing gear switch 24 is common. Conductor 26 is connected through rectifier 28 to conductor 30 which interconnects the upper side of the relay Z and the uppermost contact Xd of relay X. The purpose of rectifier 28 is merely to prevent reverse application of energy to conductor 26, namely from conductor 20, through relay contact Xd and conductor 30 when the landing gear switch 24 is open.

The lower side of relay Z is connected to ground conductor 34 through a conductor 32. A variable resistance 36 and a condenser 38 are connected in series between conductors 30 and 32, that is, across the coil of relay Z. The purpose of this R–C combination is to extend the natural release period of slow release relay Z to a value of about 2.75 seconds, although the value is not critical and in a typical case may be permitted to vary as a result of manufacturing tolerances from 2.0 seconds to 3.5 seconds, for example. The length of this delay period of relay Z is selected to span the longest delayed operating condition in the remaining portions of the system under normal conditions, so that if such other portions of the system fail to operate within the selected period, then it will be because of some extreme or abnormal condition not met by the system or because of malfunctioning of the system. The fail-safe relay Z will then release to restore braking, as previously mentioned.

Under normal operating conditions relay Z is therefore energized and its upper switch arm engages the relay contact Zc while its lower switch arm engages the dead contact Za. The contact Zc is connected to the contact Xc of relay X through conductor 40. Contact Xc is engaged by upper arm of relay X when the latter is energized and thereby forms an energizing circuit for the solenoid valve solenoid 10' through conductor 40. Thus relay X is properly termed a solenoid valve control relay. The lower switch arm of relay X is adapted to engage upper relay contact Xb during released condition of the relay, and lower contact Xa when the relay is energized. The latter contact is connected through conductor 42 to the upper side of the winding of relay L, as shown. Similar conductors 42a, 42b and 42c extend from the corresponding contacts of relays corresponding to relay X in the other similar automatic control systems for the remaining braked wheels of the airplane.

Closure of relay contact Xa forms an energizing circuit for relay L, through conductor 42 and conductor 47. This is the only energizing circuit for relay L when the airplane is on the ground, as landing gear switch 24 is then open. In flight, with landing gear switch 24 closed, relay L is continuously energized through conductor 26, rectifier 44, a section of conductor 42 and conductor 47. The purpose of rectifier 44 is to prevent reverse application of voltage from conductor 42 to conductor 26, during energization of relay X. The lower side of relay L and the lower contact La of this relay are grounded at 48. A variable resistor 49 and a condenser 52 in series therewith are connected between conductors 42 and 47 to provide an extended slow release period for relay L of about 1.5 seconds. The slow release period of this relay is not critical and in a typical case may vary between one and two seconds, for example.

Relay L may be termed an arming relay, and that portion of the circuit surrounded by dotted line 51, an arming relay circuit. This term is intended to indicate that the purpose of relay L is to "arm" the system to insure that the landing wheel brake will be released under certain conditions or that it will not be released under certain other conditions, as will be explained hereinafter.

The switch arm of relay L is connected through conductor 54 to the switch arm of relay V which is termed a locked wheel control relay. Similar conductors 54a, 54b, and 54c extend to corresponding relays (V) in the corresponding similar automatic control systems of the airplane. The upper contact Vd of relay V is engaged during the released condition of the relay and thereby establishes an energizing circuit for the relay W through rectifier 64, conductor 56, conductor 54 and relay contact La, assuming relay L is then energized. A condenser 58 is connected between conductor 56 and the upper side of relay W to provide an extended slow release period for this relay following interruption of such energizing circuit, such slow release period being about 0.6 second. However, the presence of rectifier 64 between the lower side of relay W and conductor 56 prevents condenser 58 from extending the release period of relay W when the energizing current through the latter is interrupted during flow through a separate energizing circuit for this relay, including conductor 60, as will appear hereinafter.

A separate energizing circuit for relay W and including conductor 60 can be formed by closure of skid contacts S of skid-and-recovery switch mechanism 61 constructed and arranged to operate in accordance with the disclosure in my copending application Serial No. 90,965 filed May 2, 1949. Closure of such skid contacts completes an energizing circuit for relay W through conductor 60 and ground conductor 62. Still another separate energizing circuit for relay W and including a different branch of conductor 60 may be formed by closure of recovery contacts R of switch mechanism 61. In this case the energizing circuit includes the conductor 104 and the upper contact Yb of relay Y assuming the latter is in released condition. Relay Y is termed a recovery control relay and is of the slow release type, as will be explained more fully later herein.

As disclosed in my earlier application Serial No. 90,965, mentioned above, the wheel skid-and-recovery switch mechanism 61 includes a flywheel and an overrunning clutch or slipping coupling rotatively interconnecting such flywheel and the landing wheel. When the landing wheel accelerates at the beginning of the landing run, the flywheel is spun. Torque required to spin the flywheel actuates the recovery contacts R. When the landing wheel decelerates upon application of brakes and the flywheel overruns the landing wheel through the slipping coupling, the skid contacts S are actuated by a reverse torque. When acceleration of the landing wheel commences at a speed materially below the existing speed of the flywheel, such as will usually be the case following interruption of a skid by release of the brakes, the skid contacts S will remain closed until the landing wheel accelerates to a speed about equal to the instantaneous speed of the flywheel and applies torque to the latter to increase its speed, thereby closing the recovery contacts R. The specific details of construction of the switch mechanism 61 may be obtained from said copending application, it being sufficient for present purposes to understand the foregoing general nature and operation of such mechanism.

In accordance with the presently improved system a rotative switch or commutator 66 is mechanically coupled to the landing wheel to be rotated directly thereby. Such commutator consists of an insulating body portion, in the periphery of which four conductive segments 70 are placed to be engaged successively by the sliding brush contact 68 occupying a fixed position in the landing gear structure, indicated by dotted lines 72. The contacts 70 are interconnected and are grounded through conductor 62.

The sliding brush contact 68 is connected through conductor 74 to the corner 84 of a bridge rectifier circuit. Voltage from supply conductor 20 is applied to such corner of the rectifier circuit through the voltage-dropping resistors 94 and 96. The opposite corner 86 of such rectifier is connected to ground conductor 34 through storage condenser 88. The upper corner 90 of such rectifier is connected to the upper side of relay V, while the lower corner 92 is connected to the lower side of such relay. The four rectifier elements 76, 78, 80 and 82 in the respective branches of the rectifier bridge are so arranged in polarity that a surge of current flows through relay V into condenser 88 when an insulating portion of commutator 66 initially engages brush contact 68, while another surge of current flows through relay V when brush 68 is initially engaged by a conductive segment 70 of such commutator. The latter current is the result of discharge from storage condenser 88. Thus as commutator 66 continues to rotate, relay V receives a pulsating direct current which maintains energization thereof. The circuit constants in a typical case are such that rotation of the four-segment commutator 66 at a speed above about twenty-one revolutions per minute maintains relay V steadily energized. At a slower speed of commutator rotation the relay armature is caused to open and close intermittently at a frequency dependent on such speed of rotation. Of course, increasing the number of commutator segments would reduce the speed of 21 R. P. M. to a proportionately lower value, as would increasing the slow release period of relay V.

The only purpose of condenser 95 is to remove transient oscillations in the energizing pulses of current in relay V, which oscillations were found to exist otherwise when the wave form was examined on an oscilloscope. Such condenser could be omitted from the circuit, however, without seriously impairing its operation.

The function of relay V, cooperating with commutator 66, the bridge rectifier circuit and arming relay L is to prevent locked wheel condition before ground contact of the landing wheel and to prevent release of the brakes when the airplane is at a standstill, as later explained in greater detail. When the commutator 66 ceases to rotate altogether, no current will flow in the winding of relay V. This is true if the brush 68 rests on a conductive segment 70 of the commutator, as well as when it engages the insulating body portion of such commutator, as storage condenser 88 functions as a direct-current blocking condenser, allowing only one impulse of current to flow through relay V between successive switching actions of commutator 66. Relay V may properly be termed a locked-wheel control relay. Relay V is of the slow release type, having a slow release period of about 0.37 second, although in a typical case this period may vary from 0.25 to 0.50 second, for instance, without causing difficulty.

Relay Y, which may be termed a recovery control relay, is connected to relay contact W$b$ through conductors 97 and 98, and is thereby energized during the released condition of relay W, which is normally about 0.16 second, but may vary between 0.12 and 0.20 second without causing difficulty. The slow release period of relay Y is extended to about 0.35 second by the variable resistor 100 and the condenser 102 connected in series across the winding of the relay. Again, the slow release period of relay Y may vary between 0.3 and 0.4 second without appreciably altering the operation of the system.

Relay X, which may be termed the solenoid valve control relay, is energized alternately to relay Y by relay W, the skid control relay. Thus energization of relay W produces energization of relay X through relay contact W$a$, resistor 108, conductor 106, conductor 110 and resistor 112. The purpose of resistor 108 is to limit short-circuit current flowing through conductor 106, relay contact Y$a$ and conductor 104 when recovery contacts R close during the energized or unreleased condition of relay Y. The purpose of resistor 112 connected in series with relay X is to effectively increase the latter's resistance during such short circuit condition, so that the short circuit may be effective to ground out relay X by closure of contacts R. The purpose of condenser 114 by-passing resistor 112 is to reduce the impedance of the energizing circuit for relay X upon energization of relay W to engage its contact W$a$, so that relay X will possess sufficient magnetization to draw its armature into relay-energized position. Condenser 114 therefore permits an initial heavy surge of energizing current in the winding of relay X. Although the condenser charges and the relay current is limited by resistor 112 at a lower value, this does not cause release of relay X, as the holding current of a relay is considerably less than the initial "pull in" current thereof.

The following is a table of preferred or normal values for the more important elements of the circuit in a typical system for application in a large bomber airplane:

| Element | Normal Slow Release Period |
| --- | --- |
| Relay L | 1.5 seconds. |
| Relay V | 0.37 second. |
| Relay W | 0.16 second (Inherently). 0.6 second (Prolonged by Condenser 58). |
| Relay X | Negligible. |
| Relay Y | 0.35 second. |
| Relay Z | 2.75 seconds. |

| | Value |
| --- | --- |
| Condenser 52 | 250 mfd. |
| Resistor 49 | 1,000 ohms. |
| Condenser 88 | 100 mfd. |
| Resistors 94 and 96 | 200 ohms total. |
| Condenser 58 | 100 mfd. |
| Resistor 108 | 60 ohms. |
| Resistor 112 | 100 ohms. |
| Condenser 114 | 50 mfd. |
| Resistor 100 | 500 ohms. |
| Condenser 102 | 50 mfd. |
| Resistor 36 | 2,000 ohms. |
| Condenser 38 | 500 mfd. |

*Pre-Landing Condition*

As the airplane approaches the landing strip the master switch 18 will be closed to apply voltage to conductor 20. This also energizes conductor 26, as with the airplane still off the ground, the landing gear switch 24 is then closed. Moreover, as the landing wheel has not yet rotated, the skid-and-recovery switch 61 is in neutral position with its contacts S and R both open, and commutator 66 is stationary.

Under such conditions relay L is energized through rectifier 44 and conductors 42 and 47; and because relay V is then unenergized, an energizing circuit for relay W is formed through conductor 20, rectifier 64, conductor 56, relay contact Vb, conductor 54 and relay contact La, connected in series to ground at 48. Relay X is then energized directly through relay contact Wa, its energizing current passing through resistors 108 and 112. Upon energization of relay W, relay Y, which had been energized through relay contact Wb and conductors 96 and 98, connected in series therewith, now is deenergized. This results in release of the switch arm of relay Y for movement against contact Yb upon expiration of the release delay period of this relay. Relay Z, on the other hand, is energized by current flow through landing gear switch 24, a branch of conductor 26, rectifier 29, a branch of conductor 30, and conductor 32.

Because relays Z and X are both energized at the time mentioned, the solenoid 10' of solenoid valve 10 is energized and thereby maintains the wheel brakes released from hydraulic pressure. Solenoid energizing current flows through relay contact Xc, conductor 40, relay contact Zc and conductor 41. Thus the airplane's wheel brakes remain in released condition during the approach to the landing strip and there is assurance that the initial ground contact of the wheel will not be accompanied by brake-produced skidding thereof which might go undetected and prove dangerous. It is desirable that the wheel should be permitted to accelerate substantially to running speed before the brakes are applied upon landing initially.

*Initial ground contact of wheel under normal runway conditions*

The first event occurring in the system upon contact of the wheel with the ground initially is the opening of landing gear switch 24. Although this interrupts previous flow of energizing current to relay Z, relay L remains energized through relay contact Xa. Relay Z does not release immediately, however, because of its slow release action, having a normal release period of 2.75 seconds.

If, as assumed under the present caption, the runway is not extremely slippery the acceleration of the landing wheel toward ground speed commences immediately upon ground contact of the wheel. Inertia of the flywheel in the skid-detecting mechanism (not shown) disclosed in my above-cited copending United States application Serial No. 90,965, acting in opposition to such wheel acceleration produces immediate closure of recovery contacts R and holds them closed until after the wheel has accelerated substantially to full ground speed, which usually requires at least a major fraction of a second, if not somewhat longer. It is important for reasons of braking efficiency to allow acceleration of the landing wheel substantially to full running speed before permitting application of the brakes for the first time during a landing. To accomplish this result relay X, hence relay W, must remain energized until recovery contacts R again open. Relay W is initially energized through a circuit including rectifier 64, conductor 56, relay contact Vb, conductor 54 and relay contact La, but as soon as the landing wheel begins to rotate upon contact with the ground, attendant rotation of commutator 66 effects energization of relay V and thereby opens said energizing circuit for relay W. Relay W does not release immediately, however, having a slow release period extended to 0.6 second by condenser 58 connected across its field coil. Before relay W can release, closure of recovery contacts R accompanying wheel acceleration forms a new energizing circuit for relay W through relay contact Yb and conductors 60 and 104. Thus relay W remains in its energized position continuously during the entire period of wheel acceleration. Rectifier 64 is of such polarity that it permits condenser 58 to prolong the slow release period of relay W after energization through relay contact Vb but not after energization thereof through conductor 60.

When the wheel ceases to accelerate further, having attained substantially full running speed, recovery contacts R automatically open, thereby breaking the energizing circuit for relay W. When relay W releases, so does relay X, which interrupts the solenoid energizing circuit at Xc. The solenoid valve 10 is thereby actuated for brake application.

As a result of the foregoing it will be seen that the landing wheel is allowed to attain substantially full rotative speed after initial ground contact, before the system energizes solenoid 10' to permit application of the brakes. If for any reason the system otherwise fails to deenergize the valve solenoid 10' before expiration of the release period of fail-safe relay Z, which is normally about 2.75 seconds, after landing gear switch 24 opens, relay Z will release of its own accord and break the valve solenoid energizing circuit at relay contact Zc. This would be true of fail-safe relay Z should a system failure occur, such as, for example, sticking of the contacts of either of relays W or X in relay-energized position.

*Skid-preventing operation after initial brake application*

When the landing wheel approaches full rotative speed after initial contact with the ground and the recovery contacts R have closed and then opened to apply the brakes, the wheel soon commences to skid if brake pressure is excessive as it will ordinarily be on any runway during the initial ground contact period when the weight load on the wheel is still very light. The condition of the circuit at the time such skidding begins to develop is the following: landing gear switch 24 is open, relays L, W and X are released, relays V, Y and Z are energized and contacts R and S are open. When the wheel decelerates at a sufficiently rapid rate the skid contacts S close thereby energizing relay W which in turn energizes relay X. The latter then forms an energizing circuit for solenoid 10' through relay contacts Xc anqd Zc, to release the brakes once again so that the wheel may recover from the skid.

With the energization of relays W and X as just described, relays Y and Z are deenergized, and if they remain so will release automatically after about 0.35 second and 1.5 seconds, respectively.

Upon interruption of wheel skidding by energization of the valve solenoid 10', the wheel starts to accelerate. On a slippery runway, or if the weight borne by the wheel is still relatively light, the wheel will accelerate at a slow rate. On the other hand, if the wheel carries a substantial weight load and is rolling on a runway having high coefficient of friction, it will accelerate very rapidly. The system operates in one way under one of these circumstances and in a different way under the other.

If the wheel accelerates rapidly, that is, at such a rate that the recovery contacts R are closed within a period of time equal to the slow release period of relay Y (about 0.35 second) after a skid signal effects deenergization of such relay, such recovery signal will immediately restore pressure to the brakes by deenergizing the solenoid 10'. This is accomplished by grounding the previously energized side of the coil of relay X through conductor 106, relay contact Ya, conductor 104 and closed recovery contacts R. Short circuit current through relay contact Wa caused by such closure of recovery contacts R is limited by resistor 108.

The nature of the wheel skid-and-recovery switch mechanism (61) determining the manner in which the contacts S and R thereof are opened and closed in response to wheel acceleration and deceleration, is set forth in my above cited copending application Serial No. 90,965 filed May 2, 1949. In accordance with the operation of such mechanism, rapid acceleration of the landing wheel after release of the brakes causes correspondingly quick opening of skid contacts S and closing of recovery contacts R, producing the effect mentioned in the preceding paragraph. On the other hand, such switch mechanism, including a flywheel and an overrunning clutch type of device acting cooperatively on the switch actuating structure in the mechanism, is such that the skid-sensing contacts S will remain closed for an extended period of time after release of the brakes if the wheel accelerates at a relatively slow rate. The reason this is true is that a considerable length of time is required for the slowly accelerating wheel to increase in speed above the speed of the slowly decelerating flywheel in order to open the skid contacts S and cause closure of the recovery contacts R. The normal slow release period of relay W acts as a time bridge preventing release of this relay in the short interval between such opening of skid contacts S and ensuing closure of recovery contacts R.

Thus, in the case of a relatively slippery runway or a light load on the landing wheel, the skid contacts S are held closed for an extended period. Such prolonged closure of skid contacts S maintains energization of relay W, hence deenergization of the valve solenoid 10' to keep the wheel brakes in the "off" condition and allow the wheel to continue to accelerate, however slowly. When finally recovery contacts R do close, they take the place of the skid contacts S to maintain the relay W energized and the brakes released as in the previously existing condition. Thus the wheel is permitted to continue its acceleration towards full rotative speed even though skid contacts S have opened and recovery contacts R close. When the wheel does approach full rotative speed, the recovery contacts R will finally open and thereby break the energizing circuit for relay W to cause deenergization of relay X after the short slow release period of relay W (0.15 second). Release of relay X opens the energizing circuit for solenoid 10' at relay contact Xc, and the brakes are applied.

In the presently improved system, therefore, the reapplication of brakes by deenergization of solenoid 10' occurs by one mode of operation of the circuit components including the skid-and-recovery switch mechanism 61 under conditions of rapid wheel acceleration following skid-preventing brake release, and by a different mode of operation of its components under conditions of relatively slow acceleration of the wheel. If, under the condition of rapid wheel acceleration, the recovery contacts R close before the delayed release of relay Y, such closure of recovery contacts immediately deenergizes relay X and reapplies the brakes. However, if closure of recovery contacts R occurs after release of relay Y, the brakes will not be released at that time, but later, namely when the recovery contacts R again open. Thus the slow release period of relay Y is a criterion or reference in the system by which it is possible for the apparatus to time the rapidity of reapplication of the brakes after a skid in accordance with landing conditions prevailing at the instant. If the wheel accelerates quickly after release of the brakes following a skid, then it is equally able to, and does, receive an immediate reapplication of the brakes. However, if the wheel accelerates slowly after release of the brakes following a skid, then the brakes are not reapplied until after a measured or prolonged interval during which the wheel is permitted to attain full rotative speed.

The function of relay Z in the present improved apparatus is separate from the modes of operation just described. Its only purpose is to insure that the brakes will be reapplied in any case after a period of about 2.75 seconds during energization of relay W. Thus, for example, relay Z will release automatically at the end of such period should the contacts of relay W become stuck in the lower or Wa position.

It will be understood, of course, that as the airplane continues down the runway during landing, the skid and recovery contacts S and R may close and open intermittently to cause recycling of the apparatus, hence pulsating braking effort. The overall effect of such operation is generally as described in the copending application Serial No. 145,368 cited above. The apparatus maintains high effective braking force on the wheel by preventing the latter from entering a prolonged skid and by restoring brake pressure as soon as feasible following removal thereof to interrupt the development of a skid. Certain details of the presently improved system differ from those disclosed in copending application Serial No. 145,368 with respect to the normal skid-preventing operations of the two systems, but they are fundamentally alike in general principles and objectives with reference to such operations thereof.

*Operation in event of bounce landing*

Under the caption "Prelanding condition" above herein, it was pointed out that the landing wheels should be allowed to attain substantially full rotative speed after their initial contact with the ground before the brakes are applied. One reason for this is that it enables braking to be carried out most efficiently from the outset. Another reason is that it prevents the possibility of landing with brake-locked wheels which would cause the wheels to skid from the very beginning and thereby prevent the automatic skid-detecting apparatus from being conditioned for operation by initial spinning of the reference flywheel in the skid-detecting mechanism described in my earlier application Serial No. 90,965.

It will be evident that a similar problem can arise in the case of a faulty landing in which a wheel leaves the ground after initial contact therewith and then resumes ground contact at a later time during the landing run. The difficulty here is that such initial ground contact of the wheel spins it fast enough to condition the skid-detecting apparatus for operation as in a normal landing, and, unless otherwise prevented, may permit application of the brakes before or at second ground contact of the wheel.

The presently improved system insures that the brakes will be in released position at the end of a bounce interval no matter how long that interval may be, so that brake operation will be the same on the second or renewed ground contact of the wheel as in the case of landing initially. This result is accomplished by the combined action of the skid-detecting mechanism, including skid contacts S, and that portion of the system including commutator 66, locked wheel control relay V, arming relay L and landing gear switch 24.

More particularly, during a bounce landing the landing wheel is spun upon first contact with the ground. This results in spinning of the flywheel in the skid-detecting mechanism described in application Serial No. 90,965 cited above. When the spinning wheel leaves the ground it decelerates at a faster rate than does the flywheel, resulting in closure of skid contacts S. The latter, remaining closed substantially until the flywheel finally stops spinning, energizes relay W and thereby brake-releasing relay X. Thus if the wheel contacts the ground a second time in the period before the flywheel stops spinning the brakes will be in released position, as desired. Should the bounce interval be longer, so that the wheel contacts the ground for the second time after the flywheel stops spinning, skid contacts S will then be open. However, relay W is energized nevertheless, as when the landing wheel stops spinning, which it does before the flywheel, relay V is deenergized because commutator 66 no longer rotates. Landing gear switch 24 being closed, relay L is energized; and relay W now receives energizing current through relay contacts V$b$ and L$a$.

Thus no matter how long the bounce interval may be the brakes will be released when the landing wheel again makes ground contact, relay W being energized either through skid contacts S or relay contacts V$b$ and L$a$, depending on the length of such interval. The system thereby automatically insures that the brakes will be in released condition not only upon initial ground contact but also upon ensuing ground contacts caused by bounce or equivalent faulty landings.

*Locked wheel prevention on very icy runway*

A chief purpose of the commutator 66, relay V and bridge rectifier circuit 76 et seq., in addition to preventing braked-wheel condition during initial ground contact and during bounce landings, is to prevent a similar condition on extremely slippery surfaces. As long as the commutator continues to rotate, pulses of energizing current flow through the winding of relay V. Even at very slow speeds of rotation of the wheel, hence of commutator 66, this relay is energized, although, with a typical relay used for the purpose, and with a four segment commutator as shown, such relay will not remain steadily in its upper position in the drawing but will oscillate up and down when the wheel speed drops below about twenty-one revolutions per minute. Each reversal of current in the rectifier storage condenser 89, caused by switching action of the commutator 66, either from a conductive segment to a non-conductive segment, or vice versa, produces a pulse of energizing current in relay V. Such energizing current thereby causes interruption of energizing circuit for relay W through rectifier 64 and relay contact V$d$, assuming such energizing circuit is not already interrupted by release of relay L. When commutator 66 ceases rotation altogether, or substantially so, the switching arm of relay V engages its contact V$b$ continuously. Landing gear switch 24 being open during the landing run with the wheel on the ground, energizing current for relay L must necessarily flow through relay contact X$a$ and conductors 42 and 47. Thus, if for any reason the wheel should lock following release of relay X and attendant application of the brakes, and the skid contacts S should fail to close, the resultant stopping of commutator 66 and release of relay V will insure release of the brakes by energization of relay W.

The condition which would result in a failure of skid contacts S to close despite a locked wheel during the landing roll, is very extreme and would occur only during the early portion of a landing run, when the wheel load is still relatively light and on a runway of a slipperiness having ice and a small accumulation of water on top of the ice. Nevertheless it is a possibility and the system is devised to protect against any dangerous consequences of a locked wheel under these conditions.

Under the extreme landing conditions just mentioned, when the brakes are applied the wheel will decelerate very rapidly and may approach zero speed even though the normal running speed may be as high as 800 R. P. M. or more. Moreover, because of the extreme slipperiness of the runway the wheel is very slow to accelerate following release of the brakes effected by closure of skid contacts S, so slow that it fails to close recovery contacts R at any time during the acceleration period. However, the skid contacts S remain closed for an extended period because of the slow rate of acceleration of the wheel, until finally the skid contacts themselves open and the switch mechanism assumes a neutral position with neither contacts S nor the contacts R closed. In approximately 0.15 second after opening of skid contacts S relay W releases, thereupon releasing relay X and causing reapplication of the brakes by deenergizing solenoid 16'. Because of the extremely slow rate of acceleration of the landing wheel leading up to opening of skid contacts S the flywheel speed has dropped considerably by that time. Thus the accelerating landing wheel has come only a fraction of the way up to its normal running speed by the time it overruns the flywheel and opens the skid contacts S to reapply the brakes.

With such reapplication of the brakes the wheel is again decelerated very rapidly to nearly zero speed. Thereupon the brakes are again released because of closure of skid contacts S, and there again commences a period of very slow acceleration of the wheel, again so slow that it never exceeds in closing recovery contacts R. In the meanwhile the flywheel in the skid-and-recovery switch mechanism is continuing to slow down. Thus the slowly accelerating landing wheel overtakes the decelerating flywheel at an even slower speed than it did on the preceding cycle, causing opening of skid contacts S and reapplication of the brakes approximately 0.15 second later, the release period of relay W. The entire cycle then repeats itself one or more additional times until the speed of the rotating system including the flywheel and the landing wheel has degenerated progressively to the point of substantially zero speed of rotation. When this condition is attained, the skid contacts S will fail to close as the flywheel has insufficient speed to operate the switch mechanism when the wheel brakes are again applied. A locked wheel results.

Upon such degeneration of braking to the condition of a locked wheel, relay V is released, as previously mentioned. Because of its slow release period of about 1.5 seconds, relay L remains in energized position after release of relay X shortly before. Thus an energizing circuit for relay W is formed through relay contacts Vb and La, releasing the wheel brakes once again and allowing the wheel to accelerate. The instant the wheel begins to rotate commutator 66, the latter effects reenergization of relay V and thereby interrupts such energizing circuit for relay W. However, relay W does not immediately release because the delaying action of condenser 50 when added to the natural slow release period of this relay, prevents it from releasing until about 0.6 second after relay V is energized. This amount of delay has been found to be sufficient in a typical case to start the skid-preventing mechanism on a regenerative braking cycle in which the landing wheel and flywheel speeds build up to nearly full running speed. Such regeneration is aided by the fact that an increasing proportion of the airplane's weight is now being borne by the landing wheel and its traction on even the most slippery runway is rapidly increasing.

*Brake-holding action with airplane at standstill*

The chief purpose of arming relay L is to prevent automatic release of the brakes by release of relay V when the airplane comes to a stop. Otherwise the portion of the system including commutator 66, relay V and the bridge rectifier would function in the same manner at that time as it does, for instance, at the end of a degenerative braking condition described above. Relay L accomplishes its function by automatically releasing, and thereby opening any energizing circuit for relay W through relay contact Vb, at the expiration of its slow release period (1.5 seconds) following the last skid signal producing energization of relay X. Thus when the airplane is brought to a halt the mere fact that commutator 66 has ceased to rotate will not cause energization of relay W and release of the brakes.

In flight, however, as already explained, the landing gear switch 24 is continuously closed and supplies energizing current to relay L, thereby making it possible for the relay V, in released condition, to energize the relay W and maintain the brakes in released condition.

I claim as my invention:

1. In an automatic wheel brake control system, the combination comprising normally inoperative brake-release means operable by actuation thereof to effect release of the brake, automatic skid-preventing means of a type requiring wheel rotation for the control of such means, operatively connected to said brake-release means for actuating the same in response to incipient skidding of the wheel, and locked-wheel preventing means operatively connected to said brake-release means and controlled by wheel rotation independently of said skid-preventing means, said locked-wheel preventing means operating automatically in response to the condition of a substantially non-rotating wheel to actuate said brake-release means and thereby prevent wheel lock incapable of detection by said skid-preventing means.

2. The system defined in claim 1, and disabling means controlled by the skid-preventing means and arranged to prevent operation of the locked-wheel preventing means, said disabling means operating automatically a predetermined time after the final operation of the skid-preventing means to prevent actuation of the brake-release means thereafter by said locked-wheel preventing means, and thereby permit braking of the rotated wheel when the same comes to a standstill.

3. In an automatic airplane landing wheel brake control system, the combination comprising normally inoperative airplane wheel brake-release means operable by actuation thereof to effect release of the brake, automatic skid-preventing means of a type requiring wheel rotation for the control of such means operatively connected to said brake-release means for actuating the same in response to incipient skidding of the wheel, locked-wheel preventing means operatively connected to said brake-release means and controlled by wheel rotation independently of said skid-preventing means, said locked-wheel preventing means operating automatically in response to the condition of a substantially non-rotating wheel to actuate said brake-release means and thereby prevent wheel lock incapable of detection by said skid-preventing means, arming means controlling said locked-wheel preventing means and controlled by operation of the skid-preventing means to disable such locked-wheel preventing means automatically a predetermined time following operation of said skid-preventing means to actuate said brake-release means, whereby said locked-wheel preventing means is rendered inoperative with the wheel brought to a standstill, and airplane weight-actuated means controlling said arming means and operating automatically in response to the airplane becoming airborne to prevent operation of said arming means and thereby permit operation of said locked-wheel preventing means until said skid-preventing means has again operated during the next succeeding landing of the airplane.

4. In an airplane automatic wheel brake control system, the combination comprising normally inoperative airplane wheel brake-release means operable by actuation thereof to effect release of the brake, and locked-wheel preventing means operatively connected to said brake-release means and controlled by wheel rotation, said locked-wheel preventing means operating automatically in response to the condition of a substantially non-rotating wheel to actuate said brake-release means and thereby release the brake automatically in response to stopping of wheel rotation.

5. The automatic wheel brake control system defined in claim 4, and time delay means arranged to be initiated automatically upon resumption of wheel rotation after operation of the locked-wheel preventing means, said time delay means controlling the brake-release means to delay deactuation thereof, hence reapplication of the brake, for a predetermined interval following such resumption of wheel rotation.

6. The automatic wheel brake control system defined in claim 5, and automatic skid-preventing means controlled by wheel rotation and operatively connected to the brake-release means for actuating the same in response to incipient skidding of the wheel.

7. The automatic wheel brake control system defined in claim 6, and arming means controlled by operation of the skid-preventing means and in turn automatically disabling the locked-wheel preventing means during a period after a predetermined interval of inoperativeness of such skid-preventing means.

8. The automatic wheel brake control system defined in claim 7, and means operable automatically in response to the airplane becoming airborne, and in turn controlling the arming means thereby to prevent disablement of the locked-wheel preventing means otherwise by reason of inoperativeness of the skid-preventing means with the airplane in the air.

9. The automatic wheel brake control system defined in claim 8, wherein the airborne-responsive means comprises control means actuated by displacement of the airplane landing gear oleo mechanism accompanying removal of the airplane's weight from such landing gear.

10. The automatic wheel brake control system defined in claim 9, and fail-safe means controlled by operation of the skid-preventing means and operable to disable the brake-release means automatically after a predetermined interval of inoperativeness of such skid-preventing means, said fail-safe means being rendered inoperative by the airborne-responsive means with the airplane in the air.

11. The automatic brake control system defined in claim 4, wherein the locked-wheel preventing means further includes electrically actuated means controlling the brake-release means, and the wheel-rotation controlled means comprises electric signal generating means driven by the wheel and operatively connected to the electrically actuated means for actuating the same by wheel rotation.

12. The automatic brake control system defined in claim 11, wherein the electric signal generating means comprises a wheel-rotated commutator and energizing circuit means controlled thereby providing energizing current to the electrically actuated means during rotation of said commutator.

13. In an automatic airplane landing wheel brake control system, the combination comprising normally inoperative airplane wheel brake-release means operable by actuation thereof to effect release of the brake, automatic skid-preventing means of a type requiring wheel rotation for the control of such means operatively connected to said brake-release means for actuating the same in response to incipient skidding of the wheel, and locked-wheel preventing means operatively connected to said brake-release means and controlled by wheel rotation independently of said skid-preventing means, said locked-wheel preventing means operating automatically in response to the condition of a substantially non-rotating wheel to actuate said brake-release means and thereby prevent wheel lock incapable of detection by said skid-preventing means.

GORDON W. YARBER.

References Cited in the file of this patent
UNITED STATES PATENTS

| Number | Name | Date |
|---|---|---|
| 2,170,237 | Farmer et al. | Aug. 22, 1939 |
| 2,232,752 | Wilson | Feb. 25, 1941 |
| 2,258,820 | Sorenson | Oct. 14, 1941 |
| 2,426,575 | Eksergian | Aug. 26, 1947 |
| 2,468,199 | Hines | Aug. 26, 1949 |